(12) United States Patent
Chang

(10) Patent No.: US 8,302,113 B2
(45) Date of Patent: Oct. 30, 2012

(54) DISK DRIVE MECHANISM AND ELECTRONIC DEVICE USING THE SAME

(75) Inventor: Teng-Yuan Chang, Tu-Cheng (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 13/163,748

(22) Filed: Jun. 20, 2011

(65) Prior Publication Data

US 2012/0120592 A1 May 17, 2012

(30) Foreign Application Priority Data

Nov. 12, 2010 (CN) .......................... 2010 1 0542310

(51) Int. Cl.
*G11B 17/03* (2006.01)
(52) U.S. Cl. ....................................................... 720/613
(58) Field of Classification Search .................... 720/613
See application file for complete search history.

(56) References Cited

U.S. PATENT DOCUMENTS

| 7,143,422 | B2 * | 11/2006 | Bae ................................. 720/601 |
| 7,206,261 | B2 * | 4/2007 | Kimura et al. ............. 369/30.36 |
| 7,243,358 | B2 * | 7/2007 | Bae ................................. 720/652 |
| 7,437,743 | B2 * | 10/2008 | Lee et al. ....................... 720/606 |
| 7,636,924 | B2 * | 12/2009 | Ichinose et al. ............... 720/601 |
| 8,122,463 | B2 * | 2/2012 | Yang et al. ..................... 720/650 |
| 8,141,108 | B2 * | 3/2012 | Yokota et al. .................. 720/613 |

* cited by examiner

*Primary Examiner* — Mark Blouin
(74) *Attorney, Agent, or Firm* — Altis Law Group, Inc.

(57) ABSTRACT

A disk drive mechanism includes a bracket and a tray slidably received in the bracket. The bracket includes a bottom wall, two sidewalls protruding from the bottom wall, two guiding rails fixed to the sidewalls respectively, and two sliding rails slidably coupled to the guiding rails respectively. The bottom wall and the sidewalls cooperatively define an entrance. Each guiding rail includes an end maintaining a distance from the entrance. The tray is slidably coupled to the sliding rails and is capable of being inserted into and ejected out of the bracket from the entrance via the sliding rails. A supporting member is arranged between the end of each guiding rail and the entrance. The supporting member is used to support the sliding rails in a direction perpendicular to the direction of the tray inserted into the bracket. An electronic device using the disk drive mechanism is also provided.

10 Claims, 4 Drawing Sheets

DISK DRIVE MECHANISM AND ELECTRONIC DEVICE USING THE SAME

BACKGROUND

1. Technical Field

The present disclosure relates to electronic devices, and more particularly to an electronic device having a disk drive mechanism for loading/unloading optical disks.

2. Description of Related Art

Optical disc drives, such as video compact disc (VCD) players, digital video disc (DVD) players, or computer data disc reading/writing drives are widely used for recording information onto and/or reproducing information from discs. Most optical disc drives use trays to load and unload discs. As shown in FIG. 4, a traditional optical disc drive 1 includes a bracket 2 defining an opening 4, a tray 3 slidably received in the bracket 1, and a drive mechanism (not shown) accommodated in the bracket 1. The tray 3 is used to load and unload optical disks. The drive mechanism is coupled to the tray 3 and is used for driving the tray 3 being inserted into and/or ejecting out of the bracket 1 from the opening 4.

Currently, after the disc drive is assembled, a test process for testing the tarry is carried out: firstly, the tray 3 is ejected out of the bracket 1, and then, a force is exerted to one of the sidewalls of the tray 3 to test whether the tray 3 is capable of enduring a predetermined pressure. The sidewalls of the tray 3 are usually supported by two supporting members 5 arranged at inner surfaces of opposite sidewalls of the bracket 1. However, because the supporting members 5 are away from the opening 4, the tray 3 is not effectively supported by the supporting members 5 to endure a larger pressure.

Therefore, there is room for improvement in the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the four views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
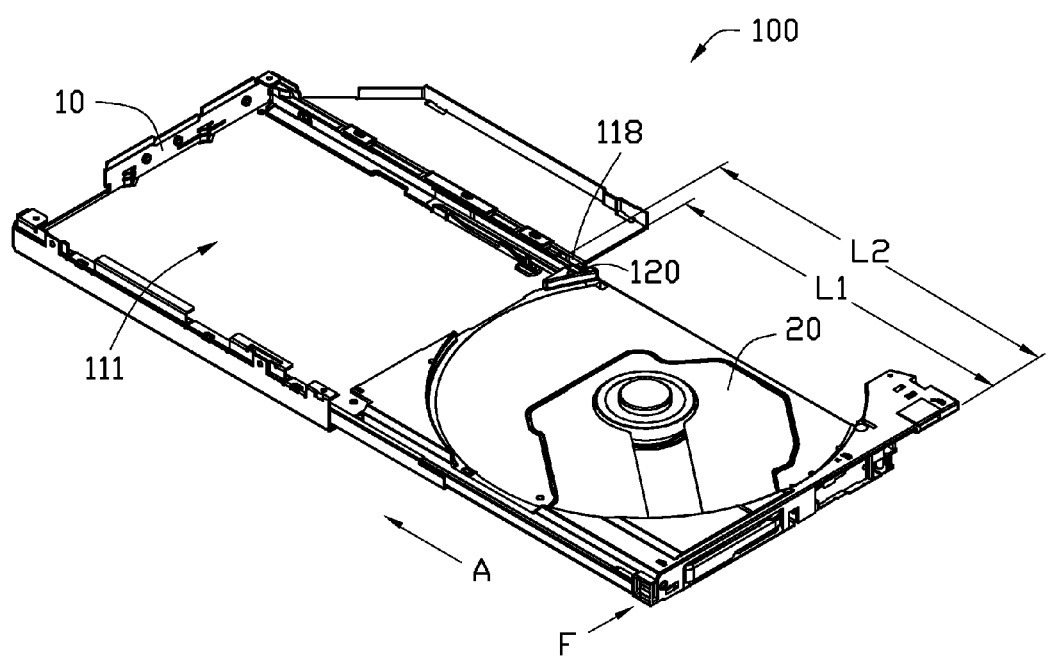
FIG. 1 is a perspective view of a disk drive mechanism in accordance with an embodiment.

Referring to FIG. 1, a disk drive mechanism 100 in accordance with an embodiment is shown. The disk drive mechanism 100 includes a bracket 10, and a tray 20 slidably received in the bracket 10. The bracket 10 is housed in a housing of an electronic device 200, such as a computer, thereby the disk drive mechanism 100 is mounted to the electronic device 200.

Figure 2:
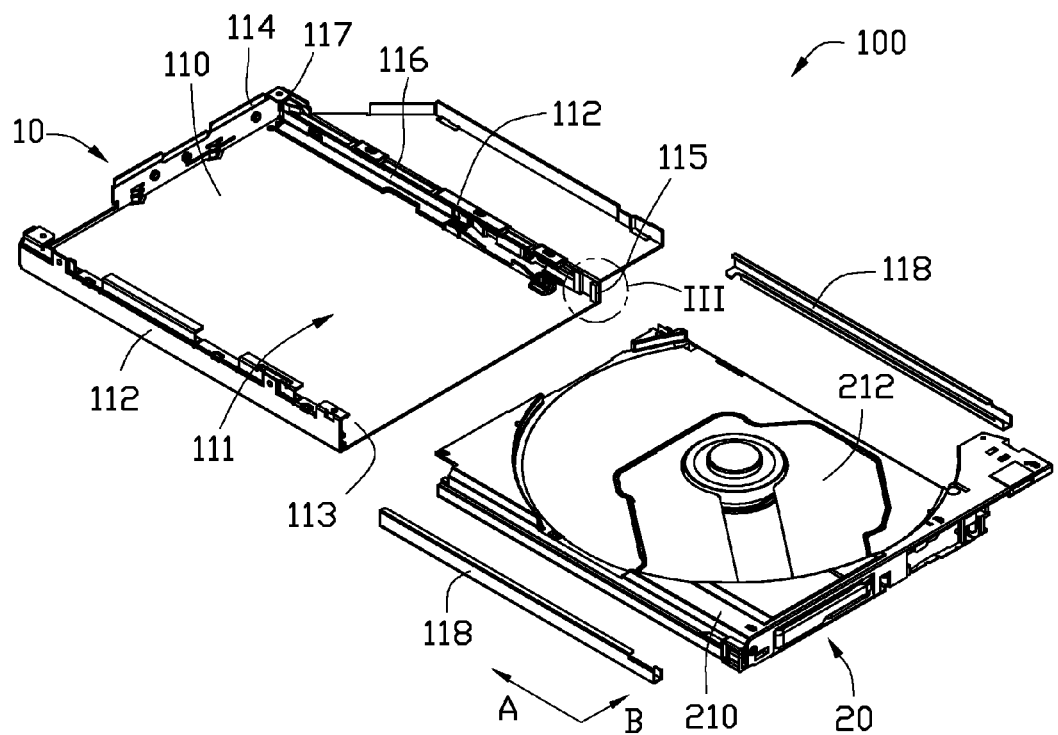
FIG. 2 is a disassembled perspective view of the disk drive mechanism of FIG. 1.

Referring also to FIG. 2, the tray 20 is adapted to load/unload disks (not show), and is capable of being inserted into and being ejected out of the bracket 10 in a direction A and in a direction reverse to A. The tray 20 includes a base 210. The base 210 is recessed to define a circular space 212 for accommodating the disks.

The bracket 10 includes a rectangular bottom wall 110, two sidewalls 112, and a rear wall 114 perpendicularly connected to the sidewalls 112. The two sidewalls 112 protrude upward from opposite sides of the bottom wall 110 respectively. The sidewalls 112, the rear wall 114 and the bottom wall 110 cooperatively define a receiving space 111 for receiving the tray 20. The receiving space 111 has an entrance 113 opposite to the rear wall 114. The tray 20 is inserted into and is ejected out of the bracket 10 from the entrance 113. Each sidewall 112 includes a front end 115 and a rear end 117 opposite to the front end 115. The front end 115 is adjacent to the entrance 113. The rear wall 114 protrudes from an end of the bottom wall 110 opposite to the entrance 113.

The bracket 10 further includes two guiding rails 116 and two sliding rails 118. The guiding rails 116 are fixed to an inner side of the two sidewalls 112 respectively. The sliding rails 118 are slidably coupled to the guiding rails 116, such that the sliding rails 118 are slidable into/out of the bracket 10 along the guiding rails 116. The sliding rails 118 are further slidably coupled to two opposite sidewalls of the base 210, whereby the base 210 is capable of being inserted into and ejected out of the bracket 10 via the sliding rails 118 along the guiding rails 116.

Figure 3:
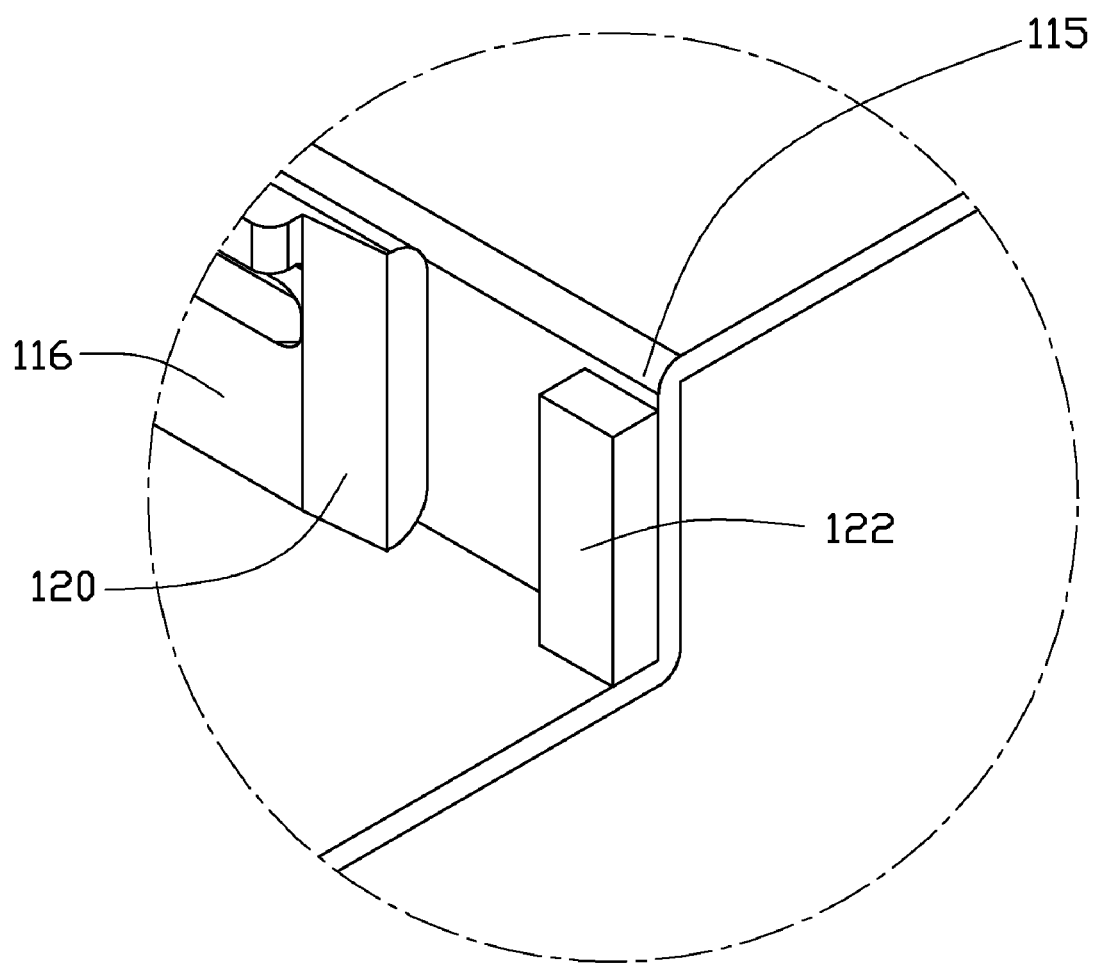
FIG. 3 is an enlarged partial view of portion III in FIG. 2.
Figure 4:
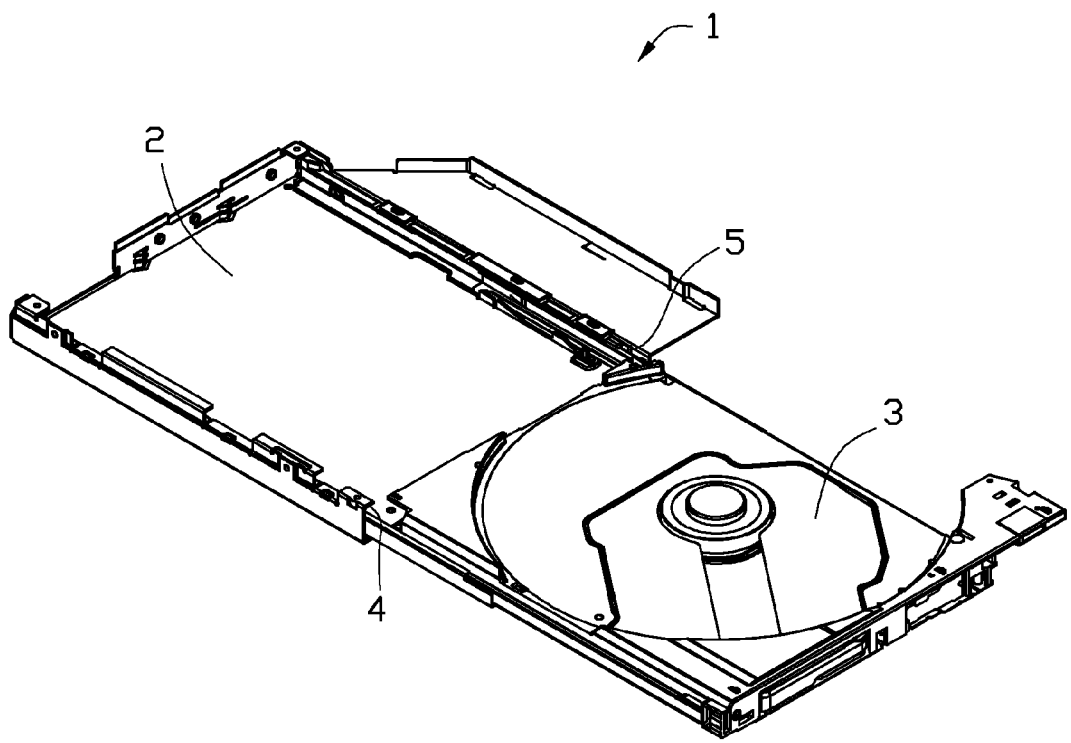
FIG. 4 illustrates a perspective view of a prior art disk drive mechanism.

Also referring to FIG. 3, a supporting block 120 and a supporting member 122 are arranged at an inner surface of each sidewall 112 and are used for supporting the sliding rails 118. The supporting blocks 120 resist against an end of the guiding rails 114 adjacent to the front end 115 a distance from the front end 115. The supporting members 122 are made of hard foam. The supporting members 122 are arranged at the front end of the sidewalls 112 a certain distance from the corresponding supporting blocks 120. In other embodiment, the supporting blocks 120 may be a portion of the guiding rails 116, Referring again to FIG. 1, when the tray 20 is ejected out of the bracket 10 and a force in a direction B perpendicular to the direction A is applied to one of sidewalls of the base 210, the base 210 is supported by the supporting blocks 120 and the supporting members 122. As is well known, the magnitude of the moment (M) is defined as the product of the force (F) and the perpendicular distance from the point of rotation called the moment arm (L), namely, the moment (M)=the force (F)*moment arm (L). Because the supporting members 122 are arranged at the front end 115 of the sidewall 112, the distance (moment arm (L1)) between the line of action of the force F and the supporting point (the supporting member 122) is less than the distance (moment arm (L2)) between the line of action of the force F and the supporting point of the moment (the supporting block 120). Thus, if a predetermined moment MO, which results that the tray 20 cannot be inserted into the bracket 10, is applied, because of the shorter moment arm (L1) of the supporting members 120, the tray 20 is capable of enduring a larger force F. Therefore, by virtue of the supporting arms 122 arranged at the front end 115 of the sidewalls 112, the tray 20 is capable of enduring a larger pressure.

It is to be understood, even though information and advantages of the present embodiments have been set forth in the foregoing description, together with details of the structures and functions of the present embodiments, the disclosure is illustrative only; and that changes may be made in detail, especially in matters of shape, size, and arrangement of parts within the principles of the present embodiments to the full extent indicated by the broad general meaning of the terms in which the appended claims are expressed.

What is claimed is:

1. A disk drive mechanism, comprising:

a bracket comprising a bottom wall, two sidewalls protruding from the bottom wall, two guiding rails fixed to the sidewalls respectively, and two sliding rails slidably coupled to the guiding rails respectively, wherein the bottom wall and the sidewalls cooperatively define an entrance, and each guiding rail comprises an end maintaining a distance from the entrance; and a tray slidably coupled to and sandwiched between the sliding rails and capable of being inserted into and ejected out of the bracket from the entrance via the sliding rails;

wherein at least one supporting member is arranged between the end of each guiding rail and the entrance, and the at least one supporting member abuts an end of the sliding rails opposite to the tray to support the sliding rails in a direction perpendicular to the direction of the tray inserted into the bracket.

2. The disk drive mechanism of claim 1, wherein the at least one supporting member is arranged at an inner surface of each sidewall adjacent to the entrance.

3. The disk drive mechanism of claim 1, wherein the at least one supporting member protrudes from an inner surface of each sidewall.

4. The disk drive mechanism of claim 1, wherein each guiding rail extends toward the entrance to form at least one supporting member.

5. The disk drive mechanism of claim 1, wherein the at least one supporting member are made of hard foam.

6. An electronic device, comprising:

a disk drive mechanism comprising a bracket and a tray slidably received in the bracket;

the bracket comprising a bottom wall, two sidewalls protruding from the bottom wall, two guiding rails fixed to the sidewalls respectively, and two sliding rails slidably coupled to the guiding rails respectively, the bottom wall and the sidewalls cooperatively defining an entrance, each guiding rail comprising an end maintaining a distance from the entrance; and the tray slidably coupled to and sandwiched between the sliding rails and capable of being inserted into and ejected out of the bracket from the entrance via the sliding rails;

wherein at least one supporting member is arranged between the end of each guiding rail and the entrance, the at least one supporting member abuts an end of the sliding rails opposite to the tray to support the sliding rails in a direction perpendicular to the direction of the tray inserted into the bracket.

7. The electronic device of claim 6, wherein the at least one supporting member is arranged at an inner surface of each sidewall adjacent to the entrance.

8. The electronic device of claim 6, wherein the at least one supporting member protrudes from an inner surface of each sidewall.

9. The electronic device of claim 6, wherein each guiding rail extends toward the entrance to form at least one supporting member.

10. The electronic device of claim 6, wherein the at least one supporting member are made of hard foam.

* * * * *